United States Patent [19]

Sobel

[11] Patent Number: 4,531,315
[45] Date of Patent: Jul. 30, 1985

[54] BRACKET FOR PICTURE FRAME

[76] Inventor: David D. Sobel, 15415 N. 22nd St., Phoenix, Ariz. 85022

[21] Appl. No.: 646,304

[22] Filed: Aug. 31, 1984

[51] Int. Cl.³ .............................................. A47G 1/06
[52] U.S. Cl. ..................................... 40/155; 40/152.1; 403/401
[58] Field of Search ............... 40/155, 152.1; 403/401, 403/402; 248/496, 497

[56] References Cited

U.S. PATENT DOCUMENTS

| 2,188,209 | 1/1940 | Sharp | 403/401 |
| 3,485,519 | 12/1969 | Chiu | 403/402 |
| 4,428,135 | 1/1984 | Sobel | 40/155 |

FOREIGN PATENT DOCUMENTS

| 1286367 | 1/1962 | France | 403/401 |
| 352125 | 3/1961 | Switzerland | 403/402 |

Primary Examiner—Gene Mancene
Assistant Examiner—Cary E. Stone
Attorney, Agent, or Firm—Bauer & Amer

[57] ABSTRACT

A corner bracket for assembling adjacent border members of an "art frame" having a longitudinal channel for receiving the bracket. The bracket is provided with two angularly disposed legs, each of which is formed with a generally triangularly shaped aperture. A wedge is insertable into the aperture to distend the legs into locking engagement with the walls of the border member.

4 Claims, 2 Drawing Figures

BRACKET FOR PICTURE FRAME

BACKGROUND OF THE INVENTION

The present invention relates to picture frame assemblies and particularly to a corner bracket used in the assembly of the picture frames of the type generally referred to as "art frames", i.e., formed of extruded aluminum and/or plastic channel members.

Ordinarily such frames are formed of extruded border members, having a channel open to the front face for the receipt of a picture or other art subject, glass, matting, etc. in conventional arrangement, and at least one channel on the rear face permitting the introduction of corner brackets, by which the border members are assembled and held together. In addition hanging brackets and the like are insertable into channels so that the frame may be hung or otherwise manipulated.

The known assemblies have a number of problems and difficulties attendant to the construction and use of the corner brackets. Generally, a metal angle bracket is employed having flat, blade-like arms which are inserted longitudinally into the corresponding channels in the adjacent border members. The inserts of the brackets are then held in place by screw means passing through the faces of the brackets to be pressed securely against the border members, thus holding the corner brackets in place and securing the border members from relative movement with respect to each other as well as relative to the corner brackets.

It was also known to provide an angle bracket with flexible projections extending from one face so that the projections and brackets can be transversely insertable into the rear channel, by merely pressing it therein. Such members generally made of rubber or relatively soft plastic did not hold well and the border members could be easily pulled apart. Where such elastic angle brackets were made of harder material, they were more difficult to insert into the rear grooves of the border members and required the use of tools to do so. The difficulty of this type arrangement was overcome in the construction shown in applicant's patent U.S. Pat. No. 4,428,135, in which the bracket was provided with a pair of spaced parallel ribs on its rear side each having an outwardly extending flange which after insertion into the channel engage the inner surface of the rear wall. A problem arising from this construction lay in the fact that the angle bracket itself lay flat against the exterior surface of the rear wall of the border member which thus caused the frame to stand somewhat away from the wall on which it was placed by the thickness of the bracket.

Another form of angle corner bracket is shown in Kapnek, U.S. Pat. No. 4,205,470 wherein the corner bracket is formed of flat metal and is bifurcated at each of the free ends of its legs into a pair of fingers. The outer corners of each finger terminate in a point or in a cutting edge extending outwardly opposite to each other transverse to the direction of the leg. This corner bracket is inserted into the slot of a border member, which is made of material which is substantially softer, i.e. wood or plastic, than the metal corner bracket. After such insertion, a blade member or cam is inserted between each of the pairs of legs and twisted by the use of a suitable tool, such as a plier so as to force the lower extremities of each pair of fingers outward, consequently causing the points or cutting edges to bite and dig into the walls of the rear slot.

While this construction is somewhat simpler than previously known, it has the disadvantage that the corner bracket, particularly the points or protuberances thereof, must be particularly fashioned since they must have effectively shaped points to bite into the border member. Further, the border member must be made of a material which is softer than the corner bracket or conversely, the corner bracket must always be made of a relatively hard material such as iron or steel. Another disadvantage lies in the fact that the retaining blade member or cam is merely twisted into place and therefore subject to becoming loose. As a result, it frequently dislodges from its effective position, afterwhich the border members can be easily pulled apart.

It is an object of the present invention to provide a corner bracket member for frame assemblies of the type described in which disadvantages and difficulties enumerated above are overcome and/or avoided.

It is a specific object of the present invention to provide a frame assembly having channeled border members joined by an easily constructed, and simply usable corner bracket, which can be assembled without the use of any special tools whatsoever.

It is a further object of the present invention to provide a corner bracket which can be assembled with a channeled border member without having any destructive effect on the channeled border member, yet being firm and secure over the life of the use of the assembly.

The foregoing objects, together with other objects, features, and advantages of the present invention will become apparent in the following disclosure.

SUMMARY OF THE INVENTION

According to the present invention, a frame assembly of the type generally referred to hereinbefore is provided with a corner bracket comprising a flat member having a pair of perpendicularly disposed blade-like legs each of which can be easily inserted longitudinally into corresponding channels or grooves formed in adjacent border members. The brackets have front and rear smooth flat surfaces that are freely and unobstructedly slidable into the grooves. Each of the legs of the brackets is formed with a substantially triangular wedge-shaped aperture extending generally along the longitudinal axis of the leg. A correspondingly shaped wedge, smaller than the largest opening of the aperture is insertable in the aperture and is slidable firmly toward the narrow or apex end of the aperture. This causes the bordering sides or web portions of the leg parallel to the aperture to distend and bow transversely outward into firm surface-to-surface engagement with the wall of the channel in the border member. Simultaneously the wedge may be pushed against the rear face of the channel in the border member. By so doing, the wedge will firmly sit against the rear face of the channel while the bracket is forced firmly against the inner surface of the lips of the channel to form a firm and secure bracing, holding the border members of the frame assembly securely in place.

Preferably, the wedges are made of elastic material such as rubber or plastic, while the corner bracket itself can be formed of metal, plastic, or any other materials. Since the bracket itself is formed of simple straightforward flat construction, it can be easily and simply made at extremely low cost. The aperture formed therein can be made by stamping and extremely low tolerances are required.

If desired, one leg of the bracket may be longer than the other be, and may be formed integral with a hanger member protruding from its rear surface.

Full details of the present invention are set forth in the following description and are illustrated in the accompanying drawings.

DESCRIPTION OF THE INVENTION

Figure 1:
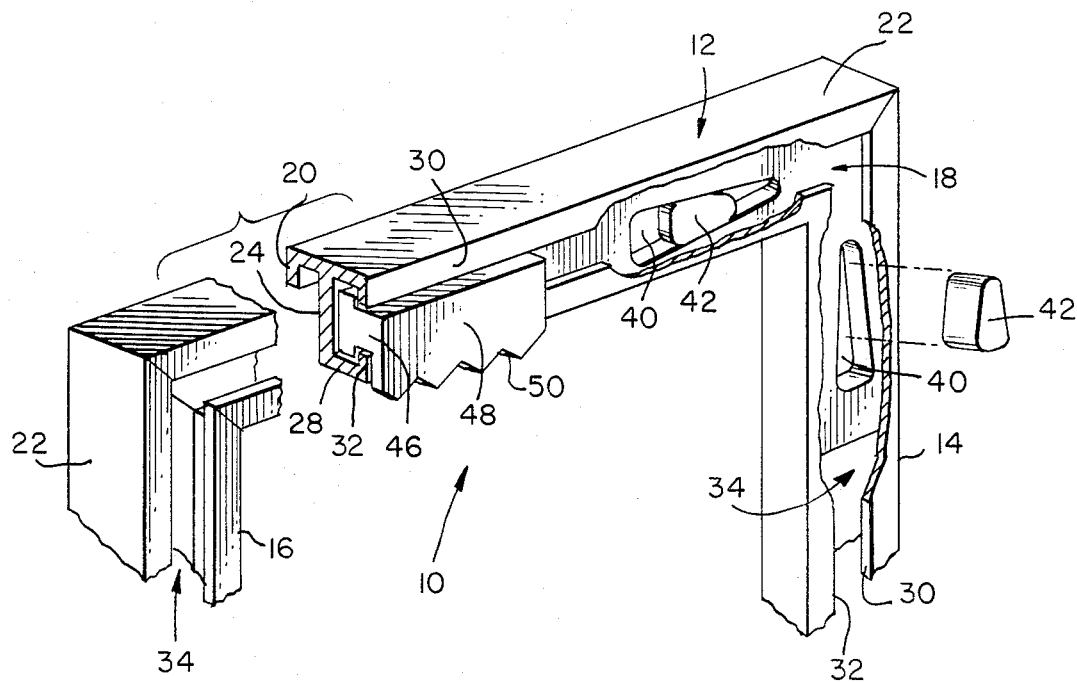
FIG. 1 is a rear perspective view of a frame embodying the present invention showing a corner bracket provided with hanger in place.

Referring in detail to the drawing, a portion of a rectangular "art frame" generally depicted by the numeral 10 is shown comprising a pair of top and bottom elongated border members 12 (only one of which is shown) and a pair of elongated side border members 14 and 16. Each border member has been suitably mitred so that they may be joined together by a corner bracket 25 generally identified by the numeral 18.

Each of the border members 12, 14 and 16 have identical transverse cross sections comprising a front face 20 having a decorative flat or curved design, a side wall 22, an intermediate wall 24, the design of which is of little consequence, and a channeled bifurcated rear wall 26. The front wall 20 and the intermediate wall 24 are spaced from each other and cooperate to retain between them the picture, artwork, glass, mats, backing, etc. which are slidable into the space prior to the final assembly of the frame 10.

The channeled rear wall 26 is adapted to receive the corner bracket 18, hanging brackets and the like completing the assembly. The rear wall 26 is integral with and extends rearward from the edge of the intermediate wall 24 by a rearward extension 28 which cooperates with the side wall 22 to form the sides of a T-shaped channel or groove 34. The rearward extension 28 and the top wall are provided with right angled edges 30 and 32 respectively which are spaced from and opposed to one another to form a pair of lips and define a slot forming the stem of T-shaped channel, denoted 34.

Figure 2:
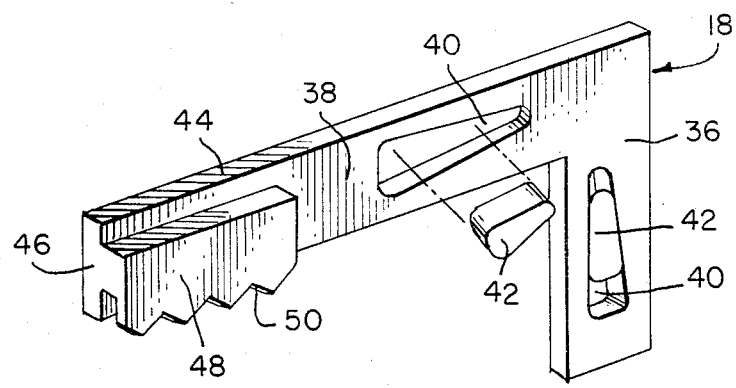
FIG. 2 is a perspective view of the rear of the corner bracket seen in FIG. 1.

As seen in FIG. 2, each corner bracket 18 is flat having legs angularly separated in a substantially L-shaped form with legs 36 and 38 extending at right angles to each other. The width of each leg and the thickness of the bracket as a whole conforms to and is smaller than the head portion of the T-shaped groove 34 to slide easily thereinto for subsequent engagement with the side walls 22 and 28 thereof.

The flat faces and side edges of the corner bracket 18 are smooth and without obstructions, projections, ribs, or the like. Cut within each leg 36 and 38 of the bracket 18 in the direction of its length or longitudinal extent is a substantially triangular aperture 40 having smooth inner sides. Preferably, the bracket 18 is extruded of plastic although it may be made of other material, having sufficient rigidity to hold the frames together.

A wedge member 42 conforms substantially to the triangular shape of the slot 40 but has overall lengthwise and widthwise dimensions less than that of the aperture 40 so as to be easily insertable therein. The wedge 42 once inserted into the aperture 40 is slidable toward the narrow end of the aperture so as to wedge thereagainst and to be seated firmly therein. During this movement toward the apex end of the aperture 40, the wedge 42 bows outward and distends the side web portions of the bracket in the vicinity of the aperture 40, forcing these side portions of the bracket into firm and tight locking engagement with the groove 34 against the inner surface of the outer wall 22 and the extension wall 28 respectively.

Preferably, the wedge 42 is made of a firm material as metal, plastic and/or rubber which is not only capable of distending the web portions of the apertures of the bracket arms, but is also sufficient in thickness to be pressed firmly against the facing bottom of the wall 24 of the T-shaped groove to further engage and lock thereagainst. The wedge 42 also acts to engage and lock the corner bracket 18 against and the inner surfaces 26 and 28 of the lips 30 and 32 providing an additional means for locking the corner bracket into place.

The triangular aperture 40 is shown with its narrow end or apex pointed toward the apex of the corner bracket. The shape of the slot, however, may be reversed so that the wider end or base of the triangle is in the direction of the corner of the bracket 18. No difference in binding or holding action is discerned by this reversal of this direction. In fact, a slight advantage might be obtained in this respect since the pulling on the adjacent border members acts to seat the wedge 42 tighter and more securely in place.

Heretofore, only the basic construction of the corner bracket has been described by which the adjacent border members may be assembled, i.e., the brackets are free of any attachment, or other incumbrances. However, as seen in the Figures, a form of the angle bracket is actually shown in which one leg 44 is extended rearward to illustrate as integrally formed a rib 46 on which is formed a hanger 48. The hanger 48 is a relatively flat, base-like member provided with a plurality of relatively spaced serrations 50 along its bottom. The dimensions of the rearward extending rib 46 are such that it will pass slidably in the space between the lips 30 and 32 with the bottom serrations 50 overlaying the lip 32. The hanger 48 can be formed on either one or both legs so that the frame, after assembly may be hung either horizontal or its vertical direction.

Various changes, modifications, embodiments have been described herein and others will be obvious to those familiar with this art. Accordingly, it is intended that the present disclosure can be taken as illustrative only of the invention and not limiting its scope.

What is claimed:

1. A frame assembly comprising a plurality of mitred border members arranged to form a frame, each border member having a plurality of walls including side and rear walls including a channel defined at least in part by a said rear wall, said rear wall having a slot extending substantially the length thereof and opening into said channel, a plurality of corner brackets securing a different pair of border members together, each of said corner brackets comprising a member having a pair of angularly directed longitudinally extending legs, each leg having an enclosed aperture formed therein along the longitudinal extent thereof, a wedge inserted in each aperture and movable therealong to distend those portions of the aperture and the leg in the vicinity of said aperture outwardly into engagement with the inner surfaces of the side and rear walls defining said channel, each said enclosed aperture and wedge having a generally triangular shape, one leg of said bracket extending in length beyond said enclosed aperture and being integrally formed with a hanger element having means thereon to adjustably engage with a support to enable the frame to be selectively supported thereby.

2. A bracket for a frame assembly having a plurality of mitred border members each having a channel defined by side and rear walls, said rear walls having a longitudinal slot opening into said channel, said bracket comprising a substantially flat member having a pair of legs set at an angle to each other conforming to the angle of which a corresponding pair of adjacent border members are to be assembled to form a frame, the legs of said bracket being axially insertable in the channels of adjacent border members, the legs of each bracket having a longitudinally extending aperture defining in each leg a pair of tapering opposed side webs extending at an angle to each other, a wedge conforming substantially to the taper of said webs insertable within said aperture and movable therein to cause distension of the webs thereof transversely to the length of said legs so that said webs resiliently engage the inner surface of the channel formed in said border members and a hanger integral with one of said bracket legs and extending rearward and downward beyond the channel in which said one bracket leg is insertable and having means thereon to support the hanger and bracket member thereby.

3. A hanger for a frame assembly formed of a plurality of border members having side and rear walls defining a channel, said rear wall having a longitudinal slot opening into said channel, said hanger comprising a base member having legs angularly directed relative to each other conforming to the angular relationship at which a plurality of adjacent border members are to be held in assembly and slidable within said channel of each such adjacent border members, a rib extending along a leg of said base member perpendicularly thereto to extend outwardly through the slot and having a tab along the longitudinal edge of said rib substantially parallel to said base member and depending at least in part downwardly therefrom over said rear wall and having its lower edge serrated to provide at least more than one notch for supporting the frame assembly, said base member having an enclosed aperture defined in each leg thereof and extending longitudinally therealong in alignment with the slot in the rear wall, the walls of said aperture being tapered, a wedge conformingly shaped to said aperture and insertable into and removable from said enclosed aperture to distend the side portions of said base member when inserted therein to move said side portions into locking engagement with the inner surfaces of the channel.

4. A bracket for assembling and hanging a picture frame comprising a pair of integrally connected legs disposed at selected angles relative to each other to hold assembled together adjacent sides of a picture frame in said selected angular relationship, a hanger unitarily formed on at least one of said legs and extending rearward and downward therefrom and having means thereon to adjustably support said bracket thereby, each of said legs having an aperture with tapered angularly directed sides, and a wedge movable in each said aperture and having sides angularly directed and conforming substantially to the taper of said aperture sides to distend the sides of the legs when said wedge is moved into tighter wedging engagement with said aperture sides.

* * * * *